(12) United States Patent
Ikeda et al.

(10) Patent No.: US 8,343,419 B2
(45) Date of Patent: Jan. 1, 2013

(54) NI BASE ALLOY SOLID WIRE FOR WELDING

(75) Inventors: Tetsunao Ikeda, Fujisawa (JP); Masaki Shimamoto, Kobe (JP); Shun Izutani, Fujisawa (JP); Hiroaki Kawamoto, Fujisawa (JP); Yushi Sawada, Fujisawa (JP); Hirohisa Watanabe, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 32 days.

(21) Appl. No.: 13/022,958

(22) Filed: Feb. 8, 2011

(65) Prior Publication Data
US 2012/0118936 A1   May 17, 2012

(30) Foreign Application Priority Data

Nov. 12, 2010   (JP) ................................. 2010-254214

(51) Int. Cl.
*C22C 19/05*   (2006.01)
(52) U.S. Cl. ........ 420/447; 420/449; 420/451; 148/410; 148/426; 148/427; 148/428; 219/146.23; 219/137 WM
(58) Field of Classification Search ................... 420/447, 420/451, 449; 148/675, 676, 677, 410, 426–428; 219/146.22, 137 WM, 146.23
See application file for complete search history.

(56) References Cited

U.S. PATENT DOCUMENTS

| | | | | |
|---|---|---|---|---|
| 7,755,001 B2 * | 7/2010 | Nakajima et al. | ........ | 219/146.22 |
| 2004/0115086 A1 * | 6/2004 | Chabenat et al. | ............. | 420/452 |
| 2008/0121629 A1 | 5/2008 | Kiser | | |

FOREIGN PATENT DOCUMENTS

| | | |
|---|---|---|
| CN | 101248197 A | 8/2008 |
| JP | 8-174269 | 7/1996 |
| JP | 2003-501557 | 1/2003 |
| JP | 2003-311473 | 11/2003 |
| JP | 2005-288500 | 10/2005 |
| JP | 2008-528806 | 7/2008 |
| JP | 2010-36223 | 2/2010 |
| JP | 2010-172952 | 8/2010 |
| KR | 10-2007-0099649 | 10/2007 |
| WO | WO 00/76718 A1 | 12/2000 |
| WO | WO 2005/070612 | 8/2005 |
| WO | WO 2006/081258 A2 | 8/2006 |

OTHER PUBLICATIONS

International Search Report and Written Opinion issued Apr. 26, 2011, in PCT/JP2011/053005 with English translation of category of cited documents.

* cited by examiner

*Primary Examiner* — Deborah Yee
(74) *Attorney, Agent, or Firm* — Oblon, Spivak, McClelland, Maier & Neustadt, L.L.P.

(57) ABSTRACT

An object of the present invention is to provide a Ni base alloy solid wire for welding, which has excellent cracking resistance to ductility dip cracking in weld metal, can increase the tensile strength of the weld metal to not less than the tensile strength of the base material, and has excellent weldability. The present invention provides a solid wire which has a composition containing Cr: 27.0 to 31.5 mass %, Ti: 0.50 to 0.90 mass %, Nb: 0.40 to 0.70 mass %, Ta: 0.10 to 0.30 mass %, C: 0.010 to 0.030 mass %, and Fe: 5.0 to 11.0 mass %, and is regulated to Al: 0.10 mass % or less, N: 0.020 mass % or less, Zr 0.005 mass % or less, P:0.010 mass % or less, S: 0.0050 mass % or less, Si: 0.50 mass % or less, and Mn: 1.00 mass % or less, with the balance including Ni and inevitable impurities.

3 Claims, 2 Drawing Sheets

NI BASE ALLOY SOLID WIRE FOR WELDING

BACKGROUND OF THE INVENTION

1. Field of the Invention

The present invention relates to a Ni base alloy solid wire for welding for the purpose of welding a Ni base alloy which has a Ni-30Cr based composition.

2. Description of the Related Art

For pressure vessels such as reactor vessels and steam generators constituting pressurized light-water reactors for nuclear power generation, a Ni-30Cr based alloy as a constituent material for the vessels is adopted as a countermeasure against SCC (stress corrosion cracking) which is problematic in the case of conventional Ni-15Cr based alloys. Welding of high-pressure vessels requires corrosion resistance comparable to that of the base material, and a filler metal is thus required which has the same constituent as the base material.

However, when a Ni-30Cr based filler metal is used for overlay welding or joint welding, the inside of weld with deposit metal piled up by multi-pass welding has a problem that cracks are likely to be caused. This intergranular cracking is distinguished from solidification cracking caused in the process of solidification of weld metal, referred to as "ductility dip cracking", and have a property of being caused in a temperature range in which solidification is completed. This ductility dip cracking refers to a phenomenon in a weld metal of high Cr containing Ni base alloy containing Cr of about 30% or more, in which repeating reheat during welding causes coarse Cr carbide to be precipitated at crystal grain boundaries to lower the grain boundary strength, that is, the bonding strength between adjacent crystal grains, as a result of which the grain boundaries open when a tensile thermal stress or a shear thermal stress loads on the grain boundaries.

As a conventional art for preventing the ductility dip cracking, a rare-earth metal is added in the case of Patent Document 1. Patent Document 1 discloses a Ni base alloy for welding, which contains C: 0.15 mass % or less, Ni: 30.0 to 80.0 mass %, Si: 1.00 mass % or less, Mn: 1.5 mass % or less, Cr: 14.0 to 31.0 mass %, Fe: 51 mass % or less, R (however, R represents at least one of rare-earth materials): 0.05 mass % or less, P: 0.030 mass % or less, and S: 0.015 mass % or less, or a Ni base alloy for welding, which contains C: 0.05 mass % or less, Ni: 58 mass %, Si: 0.5 mass % or less, Mn: 0.5 mass % or less, Cr: 27.0 to 31.0 mass %, Fe: 7.0 to 11.0 mass %, R (however, R represents at least one of rare-earth materials): 0.01 to 0.02 mass %, P: 0.030 mass % or less, S: 0.015 mass % or less, and Cu: 0.5 mass % or less.

In addition, as a conventional art for preventing the ductility dip cracking, Patent Documents 2, 3, and 4 define the ranges for constituents such as P, S, Al, Ti, Nb, and Zr. More specifically, Patent Document 2 discloses, as a nickel-chromium-iron alloy for use in the production of weld deposit, an alloy containing Cr: about 27 to 31.5 mass %, Fe: about 7 to 11 mass %, C: about 0.005 to 0.05 mass %, Mn: about 1.0 mass % or less, Nb: about 0.60 to 0.95 mass %, Si: less than 0.50 mass %, Ti: 0.01 to 0.35 mass %, Al: 0.01 to 0.25 mass %, Cu: less than 0.20 mass %, W: less than 1.0 mass %, Mo: less than 1.0 mass %, Co: less than 0.12 mass %, Ta: less than 0.10 mass %, Zr: about 0.10 mass % or less, S: less than 0.01 mass %, B: less than 0.01 mass %, and P: less than 0.02 mass %, and with the balance including Ni and impurities.

In addition, Patent Document 3 discloses a filler metal for a Ni base high Cr alloy, which has a composition containing C: 0.04 mass % or less, Si: 0.1 to 0.5 mass %, Mn: 0.2 to 1 mass %, Cr: 28 to 31.5 mass %, Mo: 0.5 mass % or less, Cu: 0.3 mass % or less, Nb: 0.1 mass % or less, Al: 0.5 to 1.1 mass %, Ti: 0.5 to 1 mass %, Al+Ti: 1.5 mass % or less, Fe: 7 to 11 mass %, and up to two of W and V at 0.05 to 0.5 mass % in total, and further including Co: 0.1 mass % or less, P: 0.02 mass % or less, S: 0.015 mass % or less, O: 0.1 mass % or less, and N: 0.03 to 0.3 mass % as inevitable impurities, with the balance composed of Ni.

Furthermore, Patent Document 4 discloses a filler metal of a Ni base high Cr alloy, which has a composition containing C: 0.04 weight % or less, Si: 0.01 to 0.5 weight %, Mn: 7 weight % or less, Cr: 28 to 31.5 weight %, Nb: 0.5 weight % or less, Ta: 0.005 to 3.0 weight %, Fe: 7 to 11 weight %, Al: 0.01 to 0.4 weight %, Ti: 0.01 to 0.45 weight %, and V: 0.5 weight % or less, and containing P: 0.02 weight % or less, S: 0.015 weight % or less, O: 0.01 weight % or less, and N: 0.002 to 0.1 weight % as inevitable impurities, with the balance composed of Ni, and further discloses that the composition may contain one or more selected from B, Zr, and rare-earth elements: 0.01 weight % or less, and may further contain Ca: 0.01 weight % or less and Mg: 0.01 weight % or less.

On the other hand, welded joints in the case of carrying out butt welding and fillet welding between Ni base alloys or between combined different materials of a Ni base alloy and a carbon steel have a problem of constraint required for equipment designs, because the tensile strength of the weld metal is inferior as compared with the base material. Thus, for the purpose of improving the tensile strength, a welding material of a high Cr containing Ni base alloy is disclosed which has Al and Ti each added at 0.5 to 3.0 mass % (Patent Document 5). Patent Document 5 discloses a welding material of a high Cr containing Ni base alloy, which has a composition containing C: 0.04 mass % or less, Si: 0.50 mass % or less, Mn: 1.00 mass % or less, Cr: 28.0 to 31.5 mass %, Mo: 0.50 mass % or less, Fe: 7.0 to 11.0 mass %, Cu: 0.30 mass % or less, Nb+Ta: 0.10 mass % or less, Al: 0.5 to 3.0 mass %, and Ti: 0.5 to 3.0 mass %, and further including P: 0.020 mass % or less and S: 0.015 mass % or less as inevitable impurities, with the balance composed of Ni.

[Prior Art Documents]
[Patent Documents]
[Patent Document 1] Japanese Patent Application Laid-Open No. 2005-288500
[Patent Document 2] Japanese Patent Application Laid-Open No. 2003-501557
[Patent Document 3] Japanese Patent Application Laid-Open No. 8-174269
[Patent Document 4] WO2005/070612
[Patent Document 5] Japanese Patent Application Laid-Open No. 2010-172952

SUMMARY OF THE INVENTION

However, the welding materials for Ni base high Cr alloys described in Patent Documents 1 to 4 mentioned above have not succeeded in sufficient prevention of ductility dip cracking. In addition, the welding material of the highly Cr containing Ni base alloy described in Patent Document 5 has the problem of poor weldability, because the material contains Al and Ti, and thus causes a large amount of slag during welding.

The present invention has been achieved in view of the problems described above, and an object of the present invention is to provide a Ni base alloy solid wire for welding, which has excellent cracking resistance to ductility dip cracking in weld metal, can increase the tensile strength of the weld metal to not less than the tensile strength of the base material, and has excellent weldability.

The Ni base alloy solid wire for welding according to the present invention has a composition containing Cr: 27.0 to 31.5 mass %, Ti: 0.50 to 0.90 mass %, Nb: 0.40 to 0.70 mass %, Ta: 0.10 to 0.30 mass %, C: 0.010 to 0.030 mass %, and Fe: 5.0 to 11.0 mass %, and is regulated to Al: 0.10 mass % or less, N: 0.020 mass % or less, Zr 0.005 mass % or less, P: 0.010 mass % or less, S: 0.0050 mass % or less, Si: 0.50 mass % or less, and Mn: 1.00 mass % or less, with the balance including Ni and inevitable impurities.

The Ni base alloy solid wire for welding preferably contains Ti+Nb+Ta: 1.20 to 1.90 mass % in total, Al: 0.05 mass % or less, C: 0.015 to 0.030 mass %, N: 0.002 to 0.020 mass %, Mg: 0.0005 to 0.015 mass %, Co: 0.05 mass % or less, and Ca: 0.002 mass % or less.

DETAILED DESCRIPTION OF THE INVENTION

Figure 1:
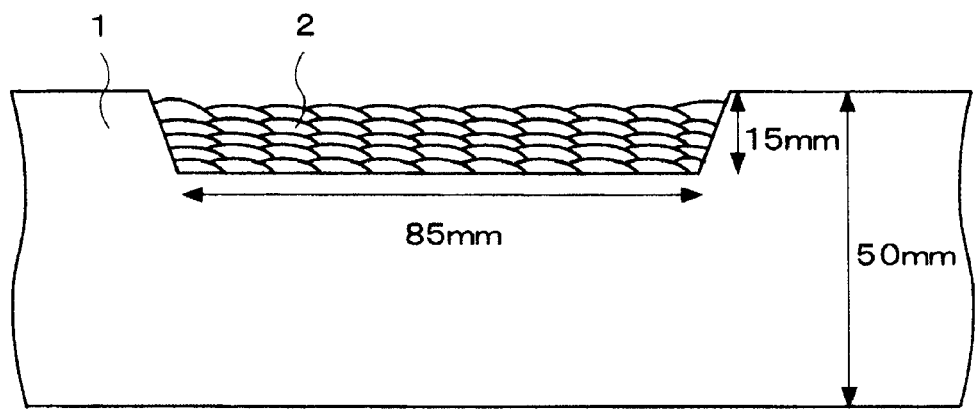
FIG. 1 is a diagram illustrating multilayer overlay welding.

The present invention will be described below in details. As described previously, the ductility dip cracking is caused by a coarse Cr carbide precipitated at grain boundaries. For this reason, it is important to suppress precipitation of the Cr carbide at grain boundaries from the point of view of prevention of ductility dip cracking. In addition, for the improvement of the tensile strength, solid solution strengthening of the matrix phase in a Ni base high Cr alloy and precipitation strengthening due to precipitate has been considered effective. Thus, As elements which have a higher ability to form carbide than Cr and can be expected to provide the precipitation strengthening mechanism, the inventors focused on three elements of Ti, Nb, and Ta and considered the appropriate additive amounts of the elements. As a result, it has been found that the simultaneous addition of Ti, Nb, and Ta precipitates a microscopic complex carbide of Ti, Nb, and Ta at grain boundaries, thereby allowing reheat crack to be suppressed effectively more than in the case of adding the respective constituents independently.

In addition to Ti, Nb, and Ta, the effect of the additive amount has been experimentally examined for metal elements such as Fe, Al, Mg, and Zr as well as nonmetal light elements such as C, N, P, and S.

After casting a Ni alloy ingot containing 28.0 to 31.5 mass % of Cr, the Ni alloy ingot is subjected to forging and rolling steps, and then a wire drawing process to manufacture a solid wire of 1.2 mm in diameter for welding. In the casting, the addition ratio of the raw materials to be used was changed to adjust the concentrations of Ni, Cr, Fe, Ti, Nb, Ta, Al, Mg, Zr, C, N, P, and S. The manufactured solid wire was used as a filler metal to manufacture deposit metal by automatic TIG welding. Comparison tests in terms of cracking resistance, tensile strength, weldability, etc. were carried out, resulting in the achievement of the present invention.

The reason that the solid wire according to the present invention has the limited composition will be described below.
"Cr: 27.0 to 31.5 Mass %"

The content of Cr is within a range of from 27.0 to 31.5 mass % so as to cover both a range of 27.0 to 31.0 mass % which is a constituent range of a UNS N06690 material which is specified by ASTM B163, B166, etc. and a range from 28.0 to 31.5 mass % which is specified by ASME SFA 5.14 ERNiCrFe-7 and ERNiCrFe-7A.
"Ti: 0.50 to 0.90 Mass %"

The Ti in the Ni alloy serves as a solid solution strengthening element, which is effective for the improvement of the tensile strength. In addition, when the Ti undergoes reheat during welding or postweld heat treatment (PWHT), strengthening is effected through precipitation of a γ' phase or $Ni_3Ti$. Thus, the Ti is remarkably effective for the tensile strength. In addition, Ti is likely to be bonded to C (carbon), and thus has an effect of suppressing intergranular corrosion caused by grain boundary precipitation of Cr carbides such as $Cr_{23}C_6$ and $Cr_7C_3$. Furthermore, Ti is likely to be bonded to Ni (nitrogen), and TiN crystallized in melted metal during welding serves as a solidification embryo, thereby resulting in a fine crystal size in the solidified composition, and further increasing the tensile strength. On the other hand, since Ti is likely to be bonded to O (oxygen), when the gas shielding during welding is incomplete, the Ti in the melted metal forms an oxide with O in the atmosphere to emerge as slag and adhere to the surface of weld bead, thereby causing the defect of such as lack of fusion during multi-pass welding. Thus, Ti is more preferably added at 0.50 to 0.90 mass %.
"Nb: 0.40 to 0.70 Mass %"

The Nb in the Ni alloy serves as a solid solution strengthening element, which is effective for the improvement of the tensile strength and creep rupture strength. In particular, the coexistence of the Nb with a certain amount of C precipitates NbC in crystal grains and at grain boundaries, thereby resulting in a further improvement in tensile strength. In addition, as in the case of the Ti, the Nb is likely to be bonded to C and thus has the effect of suppressing intergranular corrosion due to precipitation of $Cr_{23}C_6$ and $Cr_7C_3$, etc. at grain boundaries. On the other hand, the Nb incrassated at grain boundaries by solidification segregation forms an intermetallic compound ($Ni_3Nb$) which has a low melting point, thereby causing solidification cracking or reheat crack during welding. For this reason, Nb is added in the range of 0.40 to 0.70 mass %.
"Ta: 0.10 to 0.30 Mass %"

The Ta in the Ni alloy serves as a solid solution strengthening element, which is effective for the improvement of the tensile strength and creep rupture strength. The coexistence of the Ta with a certain amount of C precipitates TaC in crystal grains and at grain boundaries, thereby resulting in a further improvement in tensile strength. In particular, since the Ta is likely to form a carbide under high temperature than the Nb, the addition of a minute amount of Ta can improve the tensile strength. In addition, since Ta has a low ability to form an oxide, Ta is less likely to generate slag during welding, and Ta is thus added at 0.10 mass % or more. On the other hand, since the addition of excess Ta forms an intermetallic compound ($Ni_2Ta$) which has a low melting point, the additive amount of Ta is set to 0.30 mass % or less.
[Ti+Nb+Ta]

The simultaneous addition of Ti, Nb, and Ta precipitates a microscopic complex carbide of Ti, Nb, and Ta in 100 nm or less at grain boundaries, and can thus effectively suppress reheat crack than in the case of adding the respective components independently. For this reason, the combined addition of all of the elements Ti, Nb, and Ta is always carried out. It is to be noted that even if the combined addition of these three elements is carried out, the desired properties will not be developed when the additive amounts of the individual elements mentioned above are less than the lower limits or greater than the upper limits, which are specified respectively. Therefore, in the present invention, it is important to carry out the combined addition of these three elements, and in addition, it is also extremely important for the individual additive amounts of the respective elements to fall within appropriately the predetermined ranges. In the case of the combined addition of these three elements, in particular, it is more preferable to include these elements at 1.20 mass % or more in total, because this additive amount allows the tensile strength to reach 620 N/mm$^2$ or more. The total additive amount of Ti, Nb, and Ta is 1.90 mass % or less, which is the sum of the upper limits for the individual additive amounts of the respective elements.

Figure 3:
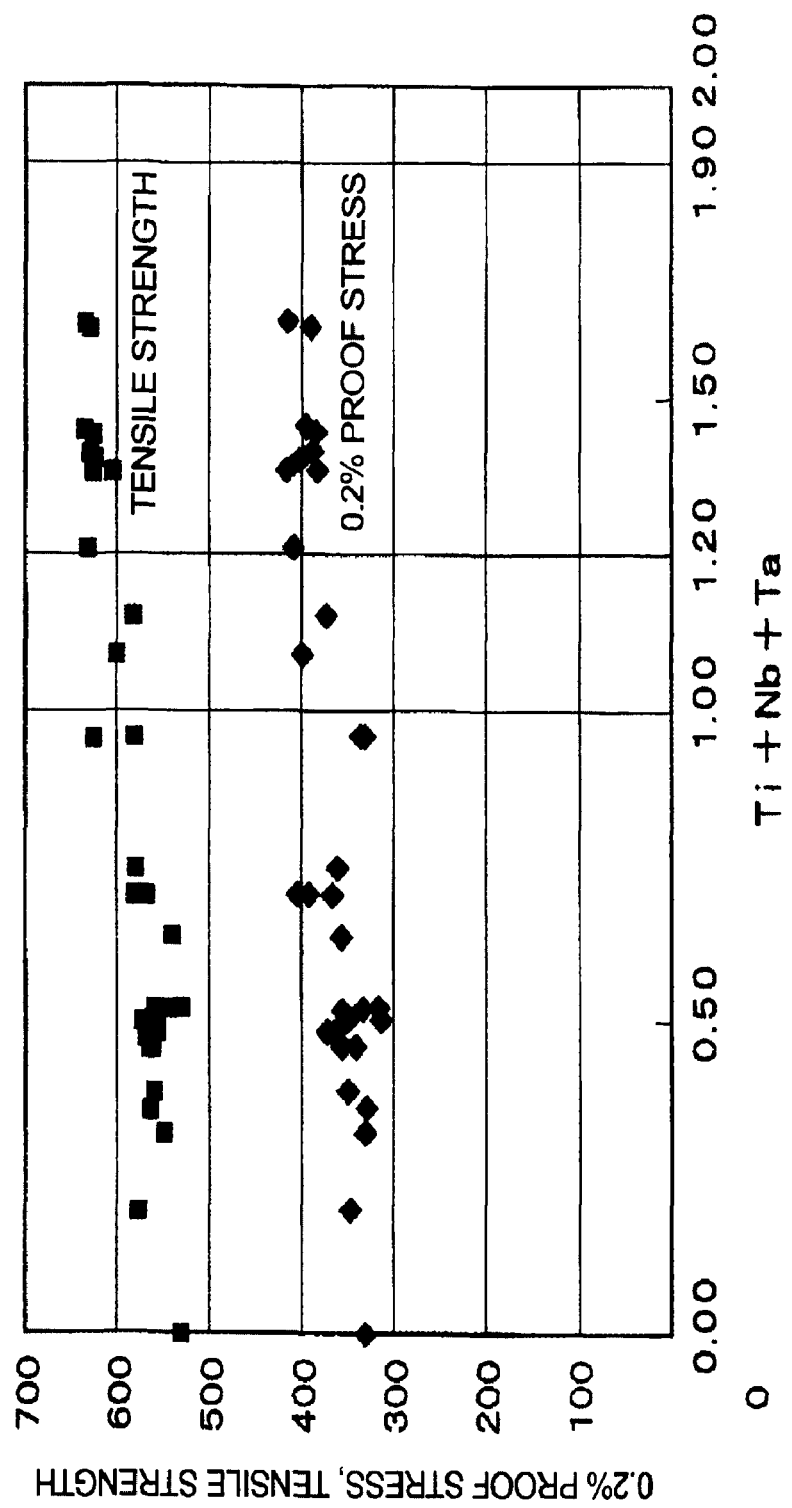
FIG. 3 is a graph showing the relationship between the content of Ti+Nb+Ta in a solid wire and the tensile strength and 0.2% proof stress of all weld metal.

FIG. 3 is a graph showing the relationship between the tensile strength and 0.2% proof stress measured by a tensile test and the content of Ti+Nb+Ta. In FIG. 3, for all of the data, the composition of the elements other than Ti+Nb+Ta falls within the scope of the present invention. As described above, when the composition of the other elements falls within the scope of the present invention, the tensile strength and 0.2% proof stress will be increased as the content of Ti+Nb+Ta is increased. Further, when the content of Ti+Nb+Ta reaches not less than 1.00 mass % which is the total of the lower limits of the individual contents of the Ti, Nb, and Ta, the tensile strength will be 600 N/mm$^2$, and further, when the content of Ti+Nb+Ta reaches 1.20 mass % or more, the tensile strength will be 620 N/mm$^2$ or more. Therefore, the content of Ti+Nb+Ta is preferably made 1.20 to 1.90 mass %.

"C: 0.010 to 0.030 Mass %"

The C in the Ni alloy serves as a solid solution strengthening element, which is effective for the improvement of the tensile strength and creep rupture strength. However, the C is bonded to the Cr to form a Cr depletion layer in the adjacent area of grain boundaries, and thus decrease the intergranular corrosion resistance. Thus, C is added at not more than 0.030 mass %. On the other hand, in the present invention in which Ti, Nb, and Ta are intentionally added, the precipitation of carbide at grain boundaries is essential for improvement in cracking resistance and tensile strength, and it is thus necessary to contain 0.010% or more of C. In particular, when the total of Ti, Nb, and Ta is 1.20 mass % or more, it is necessary to contain 0.015 mass % or more of C.

"Fe: 5.0 to 11.0 Mass %"

Since Fe as a solid solution in the Ni alloy improves the tensile strength, Fe is added at 5.0 mass % or more. However, Fe is precipitated as a low melting point Laves phase Fe$_2$Nb at grain boundaries, and melted again by reheat during multi-pass welding to cause reheat liquefaction crack at grain boundaries. For this reason, Fe is made 11.0 mass % or less.

"Al: 0.10 Mass % or Less"

Al produces a small effect of solid solution strengthening to the Ni alloy so that the tensile strength is not improved, and moreover, produces segregation at grain boundaries during solidification of melted metal to cause solidification cracking. Since Al is likely to be bonded to O (oxygen), when the gas shielding during welding is incomplete, the Al in the melted metal forms an oxide with O in the atmosphere to emerge as slag and adhere to the surface of weld bead, thereby causing the defect of lack of fusion during multi-pass welding. For this reason, Al is not intentionally added, and regulated to 0.10 mass % or less, preferably 0.05 mass % or less.

"N: 0.020 Mass % or Less"

While the N in the Ni alloy serves as a solid solution strengthening element, the N has a smaller effect as compared with C. In the case of a component system containing Ti, TiN is generated to consume Ti, and interfere with the generation of carbides, and it is thus necessary to limit the N to 0.020 mass % or less. On the other hand, the N has the effect of causing TiN crystallized in melted metal during welding to serve as a solidification embryo, thereby resulting in a fine crystal size in the solidified composition, and further increasing the tensile strength. Thus, in particular, when the total of Ti, Nb, and Ta is 1.20 mass % or more, it is necessary to contain 0.002 mass % or more of N.

"Zr: 0.005 Mass % or Less"

The Zr in the Ni base alloy has the effect of improving the strength of grain boundaries and providing a favorable hot-rolling property, through the addition of a minute amount of Zr, and it is thus commonly considered that the Zr can facilitate wire processing. However, in the present invention, Zr is not actively added. On the other hand, since the Zr disperses and remains as inclusion of a composite oxide with a high melting point in the weld wire, even in the case of the addition of a minute amount of Zr, the Zr emerges at the surface of melted metal during welding, and adheres as slag to the surface of bead, thereby causing the defect such as lack of fusion during multi-pass welding. For this reason, in the present invention, Zr is not intentionally added, and regulated to 0.005 mass % or less.

"Mg: 0.0005 to 0.015 Mass %"

The Mg is less likely to be a solid solution in the Ni base alloy, whereas the Mg is likely to be bonded to S which causes intergranular cracking. Thus, when a minute amount of Mg is added, the Mg has the effect of forming a S compound at grain boundaries to render S harmless, thereby allowing the workability in hot rolling to be improved. For this reason, it is preferable to add 0.0005 mass % or more of Mg. However, Mg reacts with O in the atmosphere to form an oxide, and emerge as slag, thereby causing lack of fusion. Thus, in the case of adding Mg, the Mg is made 0.015 mass % or less.

"Co: 0.05 Mass % or Less and S: 0.0050 Mass % or Less"

Co is changed to an isotope Co60 with a long half-life by neutron irradiation in a reactor to serve as a radiation source. Thus, Co is preferably regulated to 0.05 mass % or less.

"Ca: 0.002 Mass % or Less"

When a wire drawing process is carried out without using any Ca based wire drawing lubricant, Ca can be made 0.002 mass % or less, the generation of slag is reduced, and favorable weldability can be obtained.

"P: 0.010 Mass % or Less and S: 0.0050 Mass % or Less"

P and S produce segregation at grain boundaries during solidification of weld metal to cause solidification cracking. For this reason, P and S are respectively made 0.010 mass % or less and 0.0050 mass % or less.

"Si: 0.50 Mass % or Less and Mn: 1.00 Mass % or Less"

As the ranges specified by ASME SFA 5.14 ERNiCrFe-7 and ERNiCrFe-7A, Si is made 0.50 mass % or less, and Mn is made 1.00 mass % or less.

EXAMPLES

Next, the effects of examples according to the present invention will be described as compared with comparative examples outside the scope of the present invention. After casting a Ni alloy ingot containing 28.0 to 31.5 mass % of Cr in a vacuum melting furnace, the Ni alloy ingot was subjected to forging and rolling steps, and then a wire drawing process to manufacture solid wires of 1.2 mm in diameter for welding. In the casting step, the addition ratio of the raw materials to be used was changed to adjust the concentrations of the respective elements Ni, Cr, Fe, Ti, Nb, Ta, Mg, and C, and the concentrations of the regulated elements Al, N, Zr, P, and S were adjusted not only by changing the addition ratio of the raw materials, but also depending on the degrees of purity of the main raw materials (Ni and Cr) to be used.

The manufactured solid wires of 1.2 mm in diameter were used to carry out automatic TIG welding, and evaluations were carried out for weld metals. The methods for evaluation tests are as follows.

"Multilayer Overlay Welding Test"

As shown in FIG. 1, overlay welding 2 of five layers was carried out on a base material 1 of ASTM A533B CL.1. The welding conditions include a welding current of 200 A, a welding voltage of 11 V, a welding speed of 60 mm/min, and a wire feeding speed of 9 g/min. Further, the base material has a thickness of 50 mm, the overlay welding has a depth of 15 mm, and the bottom has a width of 85 mm. Then, the surface of the weld metal formed was evaluated visually for the amount of generated slag. In addition, five sections of bending test pieces of 10 mm in thickness were cut out in a vertical direction from the surface of the weld bead, and the cross sections subjected to bending work under the condition of a bending radius of about 50 mm were subjected to penetrant testing to evaluate the number of cracking.

Figure 2:
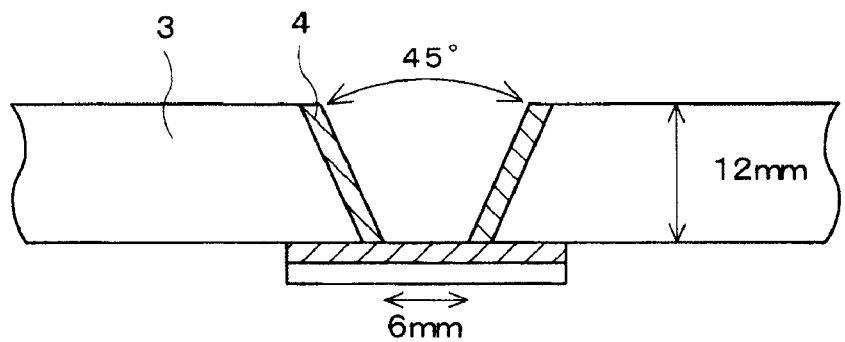
FIG. 2 is a diagram illustrating a groove shape of a test piece in a welding test.

Next, the solid wires according to the examples and comparative examples were used to apply welding to a material 3 to be welded in a groove shape shown in FIG. 2, and a round bar of 6 mm in diameter was cut out from the center of the thickness (12 mm), and subjected to a tensile test at room temperature. It is to be noted that hatched section 4 in FIG. 2 indicates the groove of the carbon steel base material subjected to buttering with the use of the welding material to be tested. This buttering prevents the constituent of the welding material from being diluted with the base material so that the properties of the welding material can be evaluated precisely.

Tables 1 to 3 below show the compositions of the solid wires according to the examples and comparative examples. Furthermore, Table 4 below shows the cracking resistance to ductility dip cracking, tensile strength, and weldability for these examples and comparative examples. Furthermore, Table 4 also shows total determination for the examples and comparative examples. The cracking resistance was evaluated in such a way that the number of cracks was counted for five cross sections of the bending test pieces to determine the cracking resistance as A, B, C, and D respectively when the average number of cracks per cross section is less than 1, 1.0 or more and less than 5.0, 5.0 or more and less than 15, and 15 or more. The tensile strength was determined as A in the case of 620 MPa or more, as B in the case of 580 MPa or more and less than 620 MPa, as C in the case of 540 MPa or more and less than 580 MPa, and D in the case of less than 540 MPa. The weldability was evaluated in accordance with the closest one of the following evaluation standards depending on wetting between bead and the base material or between bead and bead in overlay welding: grade A corresponds to favorable wetting, and thus good bead in a straight line; grade B corresponds to somewhat poor wetting, and thus disordered bead in a somewhat waving line; and grade C corresponds to extremely poor wetting, and thus significantly disordered bead in a waving line. Furthermore, the columns for the total determination are assigned with x when any of the cracking resistance, tensile strength, and weldability has grade C or D, with ○ when none of the cracking resistance, tensile strength, and weldability has grade C or D, or with ⊚ when all of the cracking resistance, tensile strength, and weldability have grade A.

TABLE 1

|  |  | Ni | Cr | C | Si | Mn | P | S | Ti |
|---|---|---|---|---|---|---|---|---|---|
| Comparative Examples | 1 | Balance | 28.7 | 0.020 | 0.15 | 0.30 | 0.0023 | 0.0005 | 1.03 |
|  | 2 | Balance | 30.4 | 0.021 | 0.21 | 0.44 | 0.0028 | 0.0009 | 0.33 |
|  | 3 | Balance | 30.2 | 0.025 | 0.16 | 0.48 | 0.0024 | 0.0007 | 0.62 |
|  | 4 | Balance | 29.5 | 0.025 | 0.17 | 0.56 | 0.0018 | 0.0012 | 0.71 |
|  | 5 | Balance | 29.4 | 0.025 | 0.32 | 0.62 | 0.0015 | 0.0018 | 0.80 |
|  | 6 | Balance | 28.9 | 0.025 | 0.16 | 0.67 | 0.0029 | 0.0022 | 0.66 |
|  | 7 | Balance | 27.7 | 0.025 | 0.35 | 0.44 | 0.0031 | 0.0023 | 0.67 |
|  | 8 | Balance | 30.1 | 0.025 | 0.14 | 0.41 | 0.0016 | 0.0024 | 0.74 |
|  | 9 | Balance | 29.7 | 0.005 | 0.27 | 0.35 | 0.0021 | 0.0016 | 0.62 |
|  | 10 | Balance | 28.1 | 0.036 | 0.26 | 0.37 | 0.0022 | 0.0009 | 0.67 |
|  | 11 | Balance | 30.2 | 0.012 | 0.18 | 0.39 | 0.0032 | 0.0014 | 0.55 |
|  | 12 | Balance | 29.1 | 0.025 | 0.29 | 0.37 | 0.0026 | 0.0016 | 0.85 |
|  | 13 | Balance | 29.7 | 0.025 | 0.24 | 0.47 | 0.0038 | 0.0007 | 0.74 |
|  | 14 | Balance | 30.5 | 0.025 | 0.24 | 0.72 | 0.0034 | 0.008 | 0.66 |
|  | 15 | Balance | 30.6 | 0.025 | 0.33 | 0.58 | 0.0028 | 0.0016 | 0.70 |
| Examples | 16 | Balance | 29.7 | 0.025 | 0.26 | 0.69 | 0.0024 | 0.0015 | 0.65 |
|  | 17 | Balance | 30.1 | 0.025 | 0.27 | 0.64 | 0.0027 | 0.0014 | 0.72 |
|  | 18 | Balance | 29.1 | 0.021 | 0.33 | 0.25 | 0.0026 | 0.0015 | 0.55 |
|  | 19 | Balance | 31.2 | 0.016 | 0.14 | 0.37 | 0.0014 | 0.0004 | 0.72 |
|  | 20 | Balance | 30.0 | 0.024 | 0.16 | 0.45 | 0.0025 | 0.0007 | 0.55 |
|  | 21 | Balance | 29.4 | 0.022 | 0.24 | 0.82 | 0.0011 | 0.0005 | 0.80 |
|  | 22 | Balance | 30.1 | 0.027 | 0.28 | 0.76 | 0.0012 | 0.0008 | 0.55 |
|  | 23 | Balance | 30.0 | 0.025 | 0.19 | 0.51 | 0.0015 | 0.0002 | 0.66 |
|  | 24 | Balance | 28.5 | 0.026 | 0.24 | 0.55 | 0.0014 | 0.0008 | 0.83 |

TABLE 2

|  |  | Nb | Ta | Ti + Nb + Ta | Al | Fe | Mg |
|---|---|---|---|---|---|---|---|
| Comparative Examples | 1 | 0.58 | 0.23 | 1.84 | 0.02 | 7.2 | 0.0020 |
|  | 2 | 0.58 | 0.17 | 1.08 | 0.05 | 8.5 | 0.0042 |
|  | 3 | 0.24 | 0.19 | 1.05 | 0.04 | 8.8 | 0.0085 |
|  | 4 | 0.82 | 0.21 | 1.74 | 0.04 | 9.1 | 0.0056 |
|  | 5 | 0.58 | 0.05 | 1.43 | 0.02 | 10.1 | 0.0046 |
|  | 6 | 0.63 | 0.38 | 1.67 | 0.03 | 8.7 | 0.0042 |
|  | 7 | 0.85 | 0.42 | 1.94 | 0.01 | 10.5 | 0.0047 |
|  | 8 | 0.20 | 0.05 | 0.99 | 0.02 | 5.7 | 0.0010 |
|  | 9 | 0.63 | 0.12 | 1.37 | 0.02 | 10.4 | 0.0015 |
|  | 10 | 0.54 | 0.21 | 1.42 | 0.03 | 9.5 | 0.0026 |
|  | 11 | 0.48 | 0.27 | 1.30 | 0.02 | 9.9 | 0.0123 |
|  | 12 | 0.51 | 0.18 | 1.54 | 0.20 | 8.7 | 0.0016 |
|  | 13 | 0.44 | 0.20 | 1.38 | 0.02 | 3.8 | 0.0130 |
|  | 14 | 0.67 | 0.25 | 1.58 | 0.03 | 12.2 | 0.0095 |
|  | 15 | 0.62 | 0.19 | 1.51 | 0.05 | 8.5 | 0.0084 |
| Examples | 16 | 0.57 | 0.22 | 1.44 | 0.03 | 6.5 | 0.0182 |
|  | 17 | 0.66 | 0.23 | 1.61 | 0.01 | 10.4 | 0.0077 |
|  | 18 | 0.48 | 0.12 | 1.15 | 0.02 | 10.1 | 0.0025 |
|  | 19 | 0.54 | 0.15 | 1.41 | 0.02 | 9.2 | 0.0042 |

TABLE 2-continued

|    | Nb   | Ta   | Ti + Nb + Ta | Al   | Fe   | Mg     |
|----|------|------|--------------|------|------|--------|
| 20 | 0.42 | 0.12 | 1.09         | 0.08 | 10.7 | 0.0020 |
| 21 | 0.52 | 0.13 | 1.45         | 0.01 | 9.7  | 0.0012 |
| 22 | 0.44 | 0.27 | 1.26         | 0.05 | 9.9  | 0.0034 |
| 23 | 0.51 | 0.23 | 1.40         | 0.01 | 8.4  | 0.0007 |
| 24 | 0.65 | 0.14 | 1.62         | 0.02 | 8.5  | 0.0027 |

TABLE 3

|                      |    | Zr      | Ca     | Co   | N     |
|----------------------|----|---------|--------|------|-------|
| Comparative Examples | 1  | <0.005  | 0.0014 | 0.02 | 0.005 |
|                      | 2  | <0.005  | 0.0012 | 0.04 | 0.007 |
|                      | 3  | <0.005  | 0.0008 | 0.04 | 0.006 |
|                      | 4  | <0.005  | 0.0005 | 0.03 | 0.004 |
|                      | 5  | <0.005  | 0.0002 | 0.04 | 0.009 |
|                      | 6  | <0.005  | 0.0017 | 0.05 | 0.010 |
|                      | 7  | <0.005  | 0.0003 | 0.04 | 0.012 |
|                      | 8  | <0.005  | 0.0004 | 0.05 | 0.005 |
|                      | 9  | <0.005  | 0.0027 | 0.09 | 0.001 |
|                      | 10 | <0.005  | 0.0007 | 0.04 | 0.013 |
|                      | 11 | <0.005  | 0.0008 | 0.03 | 0.021 |
|                      | 12 | <0.005  | 0.0004 | 0.05 | 0.012 |
|                      | 13 | <0.005  | 0.0006 | 0.08 | 0.006 |
|                      | 14 | <0.005  | 0.0007 | 0.05 | 0.007 |
|                      | 15 | 0.0080  | 0.0002 | 0.05 | 0.005 |
| Examples             | 16 | <0.005  | 0.0015 | 0.04 | 0.007 |
|                      | 17 | <0.005  | 0.0080 | 0.04 | 0.009 |
|                      | 18 | <0.005  | 0.0004 | 0.05 | 0.007 |
|                      | 19 | <0.005  | 0.0004 | 0.03 | 0.007 |
|                      | 20 | <0.005  | 0.0012 | 0.02 | 0.010 |
|                      | 21 | <0.005  | 0.0006 | 0.04 | 0.002 |
|                      | 22 | <0.005  | 0.0007 | 0.08 | 0.004 |
|                      | 23 | <0.005  | 0.0006 | 0.03 | 0.007 |
|                      | 24 | <0.005  | 0.0007 | 0.03 | 0.009 |

TABLE 4

|             |    | Cracking Resistance | Tensile Strength | Weldability | Others | Total Determination |
|-------------|----|---------------------|------------------|-------------|--------|---------------------|
| Comparative Example | 1  | A | A | C | Excess slag | X |
|             | 2  | C | B | A |             | X |
|             | 3  | C | B | A |             | X |
|             | 4  | D | D | A |             | X |
|             | 5  | C | A | A |             | X |
|             | 6  | C | A | A |             | X |
|             | 7  | D | D | A |             | X |
|             | 8  | D | C | A |             | X |
|             | 9  | D | D | C | Excess slag | X |
|             | 10 | A | A | A | Poor corrosion resistance | X |
|             | 11 | C | B | A |             | X |
|             | 12 | D | A | C | Excess slag | X |
|             | 13 | A | C | A |             | X |
|             | 14 | C | A | A |             | X |
|             | 15 | A | A | C | Excess slag | X |
| Example     | 16 | A | A | B | Somewhat excess slag | ○ |
|             | 17 | A | A | B | Somewhat excess slag | ○ |
|             | 18 | A | B | A |             | ○ |
|             | 19 | B | A | A |             | ○ |
|             | 20 | A | B | B | Somewhat excess slag | ○ |
|             | 21 | A | A | A |             | ◎ |
|             | 22 | A | A | B | Much Co     | ○ |
|             | 23 | A | A | A |             | ◎ |
|             | 24 | A | A | A |             | ◎ |

As shown in Table 4, Comparative Example 1 containing Ti at 0.90 mass % or more caused a large amount of slag to provide poor weldability. Comparative Example 2 containing Ti at less than 0.50 mass % caused cracks in the weld metal, and failed to reach a tensile strength of 620 MPa. Comparative Example 3 containing Nb at less than 0.40 mass % caused cracks in the weld metal, and failed to reach a tensile strength of 620 MPa. Comparative Example 4 containing excess Nb caused solidification cracking at the surface of the weld metal. In addition, since there are a lot of cracks in the tensile test piece of Comparative Example 4, the tensile test piece was fractured immediately after yield in the tensile test, thereby resulting in an extremely low tensile strength. Comparative Example 5 which is deficient in Ta caused cracks in the weld metal. Comparative Example 6 containing excess Ta caused solidification cracking at the surface of the weld metal. In addition, Comparative Example 6 is economically insufficient because of its high cost. Comparative Example 7 containing excess Nb and Ta caused cracks at the surface of and in the weld metal. In addition, since there are a lot of cracks in the tensile test piece of Comparative Example 7, the tensile test piece was fractured immediately after yield in the tensile test, thereby resulting in an extremely low tensile strength. Furthermore, Comparative Example 7 is economically insufficient because of its high cost. Comparative Example 8 which is deficient in Nb and Ta caused cracks in the weld metal. In addition, Comparative Example 8 also has a low tensile strength. Comparative Example 9 which is low in C provided insufficient precipitation of carbide at grain boundaries, thus causing cracks in the weld metal, and also providing a low tensile strength. In addition, remaining Ca at the surface of the wire caused a lot of slag. Comparative Example 10 is not adequate, because Comparative Example 10 which is high in C have a Cr depletion layer formed in the adjacent area of grain boundaries, leading to high susceptibility to intergranular corrosion and stress corrosion cracking. Comparative Example 11 which is high in N crystallized a Ti nitride out in crystal grains, but provided insufficient precipitation of carbide at grain boundaries, thus causing cracks in the weld metal. Comparative Example 12 which is high in Al caused solidification cracking. In addition, Comparative Example 12 caused a large amount of slag. Comparative Example 13 which is low in Fe provided a low tensile strength. Comparative Example 14 which is high in Fe caused cracks in the weld metal. Comparative Example 15 containing excess Zr caused a lot of slag.

In contrast to these comparative examples, Examples 16 to 20 and 22 are examples which satisfy what is claimed in claim 1 of the present application, whereas Examples 21, 23 and 24 are examples which satisfy what is claimed in claim 2 of the present application. Therefore, these examples achieved grade A or B for all of the items, thereby providing excellent properties.

What is claimed is:
1. A Ni base alloy solid wire for welding, the Ni base alloy solid wire having a composition consisting essentially of:
Cr: 27.0 to 31.5 mass %,
Ti: 0.50 to 0.90 mass %,
Nb: 0.40 to 0.70 mass %,
Ta: 0.10 to 0.30 mass %,
C: 0.010 to 0.030 mass %,
Fe: 5.0 to 11.0 mass %,
Al: 0.10 mass % or less,
N: 0.020 mass % or less,
Zr 0.005 mass % or less,
P: 0.010 mass % or less,
S: 0.0050 mass % or less,
Si: 0.50 mass % or less, and
Mn: 1.00 mass % or less, with the balance including Ni and inevitable impurities.

2. The Ni base alloy solid wire for welding according to claim 1, wherein Ti+Nb+Ta: 1.20 to 1.90 mass % in total, Al: 0.05 mass % or less, C: 0.015 to 0.030 mass %, and N: 0.002 to 0.020 mass %, and wherein said Ni base alloy solid wire further consists essentially of Mg: 0.0005 to 0.015 mass %, Co: 0.05 mass % or less, and Ca: 0.002 mass % or less.

3. The Ni base alloy solid wire for welding according to claim 1, wherein said Ni base alloy solid wire has a tensile strength of 620 MPa or more.

* * * * *